(12) United States Patent
Waldron et al.

(10) Patent No.: US 7,978,867 B2
(45) Date of Patent: *Jul. 12, 2011

(54) AUDIO SIGNAL SYSTEM

(75) Inventors: Joan Phillips Waldron, Fort Collins, CO (US); Joan Billger Burleigh, Fort Collins, CO (US); Brett William Jelkin, Windsor, CO (US)

(73) Assignee: Able Planet, Incorporated, Wheat Ridge, CO (US)

( * ) Notice: Subject to any disclaimer, the term of this patent is extended or adjusted under 35 U.S.C. 154(b) by 1173 days.

This patent is subject to a terminal disclaimer.

(21) Appl. No.: 11/188,519

(22) Filed: Jul. 25, 2005

(65) Prior Publication Data

US 2006/0029248 A1 Feb. 9, 2006

Related U.S. Application Data

(63) Continuation-in-part of application No. 10/864,692, filed on Jun. 9, 2004, and a continuation-in-part of application No. 10/864,691, filed on Jun. 9, 2004.

(60) Provisional application No. 60/478,142, filed on Jun. 11, 2003, provisional application No. 60/478,152, filed on Jun. 11, 2003, provisional application No. 60/478,151, filed on Jun. 11, 2003.

(51) Int. Cl.
*H04R 25/00* (2006.01)
(52) U.S. Cl. .................................. 381/312; 379/443
(58) Field of Classification Search .................. 700/94; 381/312, 315, 322, 326; 379/52, 443, 444
See application file for complete search history.

(56) References Cited

U.S. PATENT DOCUMENTS

| 4,160,122 A |   | 7/1979  | Jacobson |         |
|-------------|---|---------|----------|---------|
| 4,419,544 A |   | 12/1983 | Adelman  |         |
| 4,689,818 A |   | 8/1987  | Ammitzboll |       |
| 4,697,283 A | * | 9/1987  | Lafrance et al. | 379/443 |
| 4,764,957 A |   | 8/1988  | Angelini et al. |   |
| 5,533,120 A | * | 7/1996  | Staudacher | 379/392 |
| 5,796,821 A |   | 8/1998  | Crouch et al. |    |

(Continued)

FOREIGN PATENT DOCUMENTS

EP  0365393   4/1990
JP  55-13432  1/1980

(Continued)

OTHER PUBLICATIONS

U.S. Appl. No. 10/864,691, filed Jun. 9, 2004 (Waldron et al.).*

(Continued)

*Primary Examiner* — Walter F Briney, III
(74) *Attorney, Agent, or Firm* — Glenn H. Lenzen; Husch Blackwell LLP

(57) ABSTRACT

An audio signal system is provided having, in one embodiment, a magnetostrictive core of varying shapes, sizes, and permeability. The core is wound with a wire, thereby forming an inductor for producing a magnetic field when current is passed through the wire. A speaker, or other audio output device, is positioned in parallel or series with the inductor. In operation, an audio signal is received and transmitted to the speaker or other audio output device, wherein a replication of the received signal is produced. An output of the magnetostrictive inductor couples with the replicated audio signal to modify and enhance the quality of the projected signal. In yet another embodiment, digital signal processing may be used to modify the received signal as well.

12 Claims, 9 Drawing Sheets

U.S. PATENT DOCUMENTS

| | | | |
|---|---|---|---|
| 6,169,813 | B1 | 1/2001 | Richardson |
| 6,320,959 | B1 | 11/2001 | Crouch et al. |
| 6,785,394 | B1 | 8/2004 | Olsen et al. |
| 2001/0055386 | A1* | 12/2001 | Waldron et al. ............ 379/444 |
| 2002/0141545 | A1 | 10/2002 | Segovia |
| 2003/0031339 | A1 | 2/2003 | Marshall et al. |
| 2004/0252812 | A1 | 12/2004 | Waldron et al. |
| 2005/0117713 | A1 | 6/2005 | Waldron et al. |

FOREIGN PATENT DOCUMENTS

| | | |
|---|---|---|
| JP | 63-74852 | 5/1988 |
| JP | 09-261797 | 10/1997 |
| JP | 2000-340426 | 8/2000 |
| JP | 2001-044042 | 2/2001 |
| WO | 0172084 A2 | 9/2001 |
| WO | 0230153 A | 4/2002 |
| WO | 03088709 A1 | 10/2003 |

OTHER PUBLICATIONS

U.S. Appl. No. 10/864,692, filed Jun. 9, 2004 (Waldron et al.).*

METGLAS Solutions MICROLITE. Metglas website [online], Jun. 2002 and Aug. 2002 [retrieved on Mar. 1, 2007]. Retreived from the Internet: http:llweb.archive.orglweb1200206161045391www.metglas.comlproductslpage5 1 6 3.htm>, http:llweb.archive.orglweb1200206220905581www.metglas.comlproductslpage5_1 6 3 I.htm> and http:llweb.archive.orglweb1200208031519341www.metglas.comlproductslpage5 1 2 4.htm>.*

Hoolihan, ANSI C63.19: Establishing Compatibility Between Hearing Aids and Cellular Telephone, http://web.archive.org/web/20010720043329/http://www.ce-mag.com/archive/01/Spring/Hoolihan.html (archived by the WayBack Machine on Jul. 20, 2001) (retrieved Jul. 19, 2008).

* cited by examiner

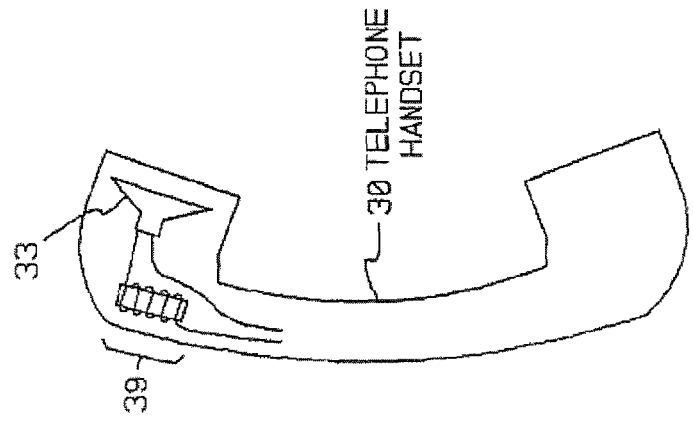
FIG 2
FIG 3
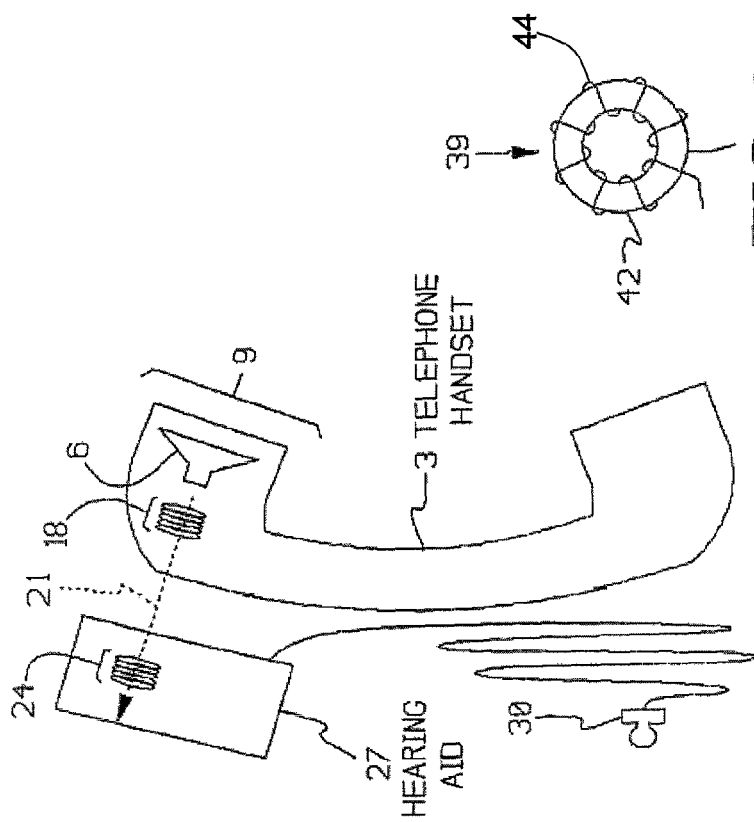
FIG 1
PRIOR ART

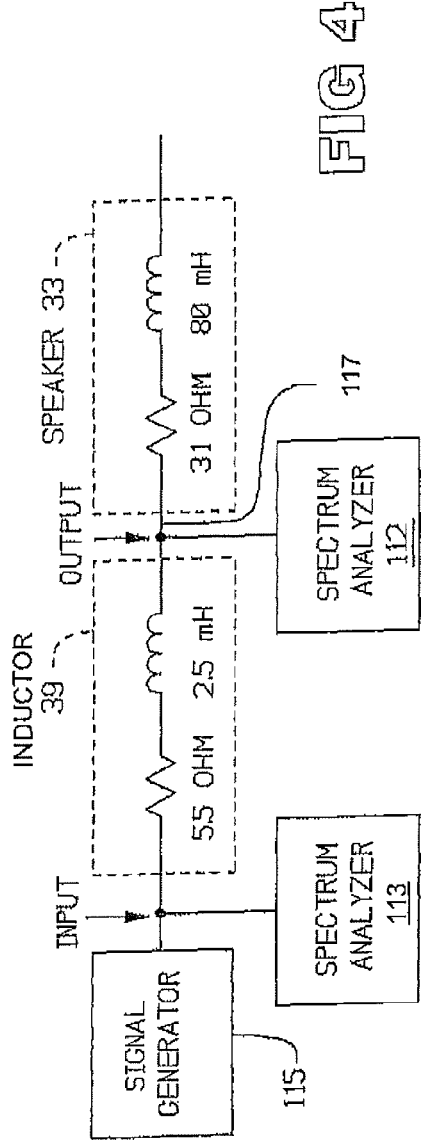
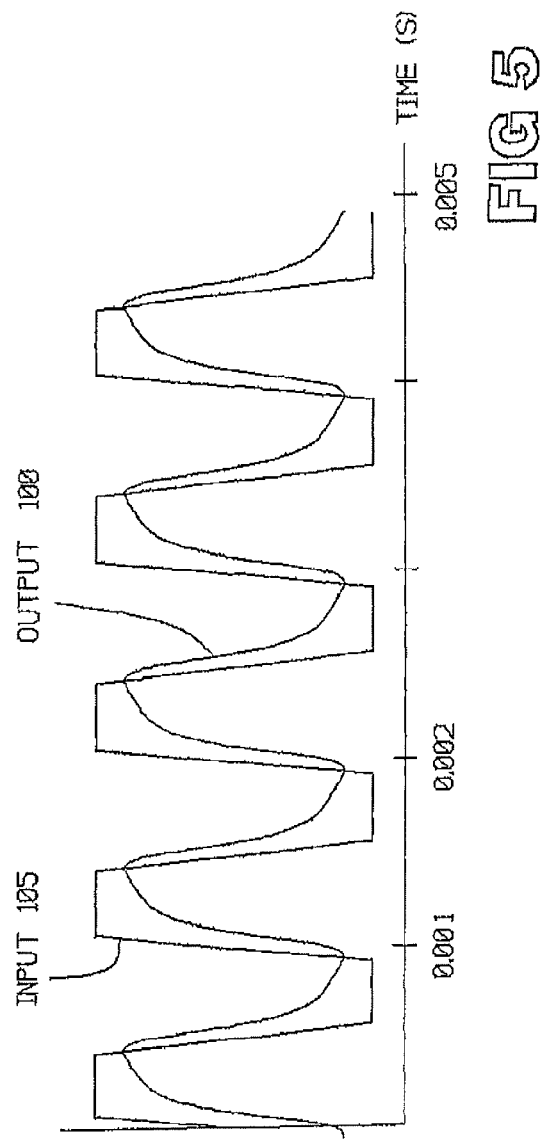

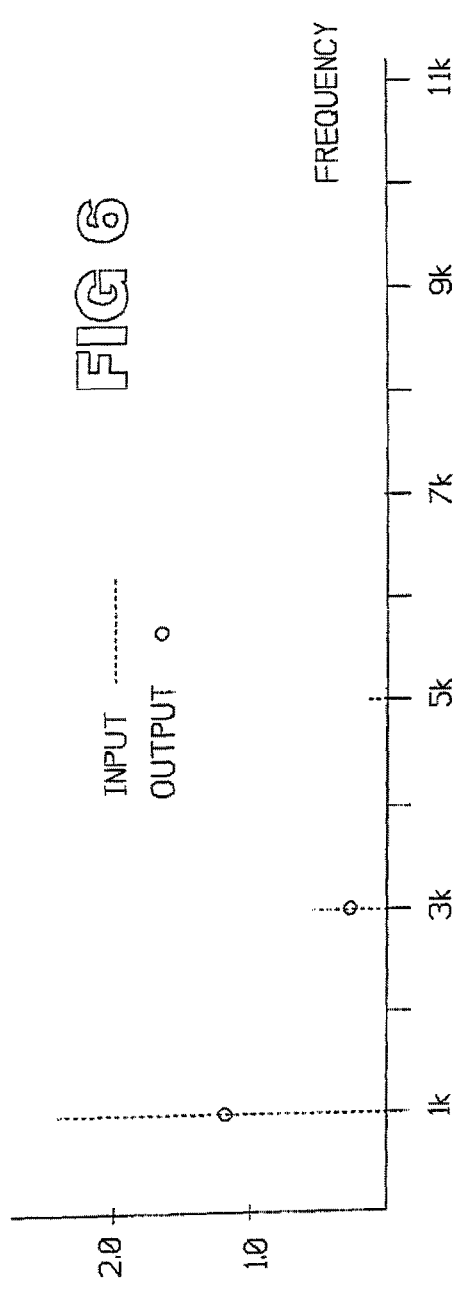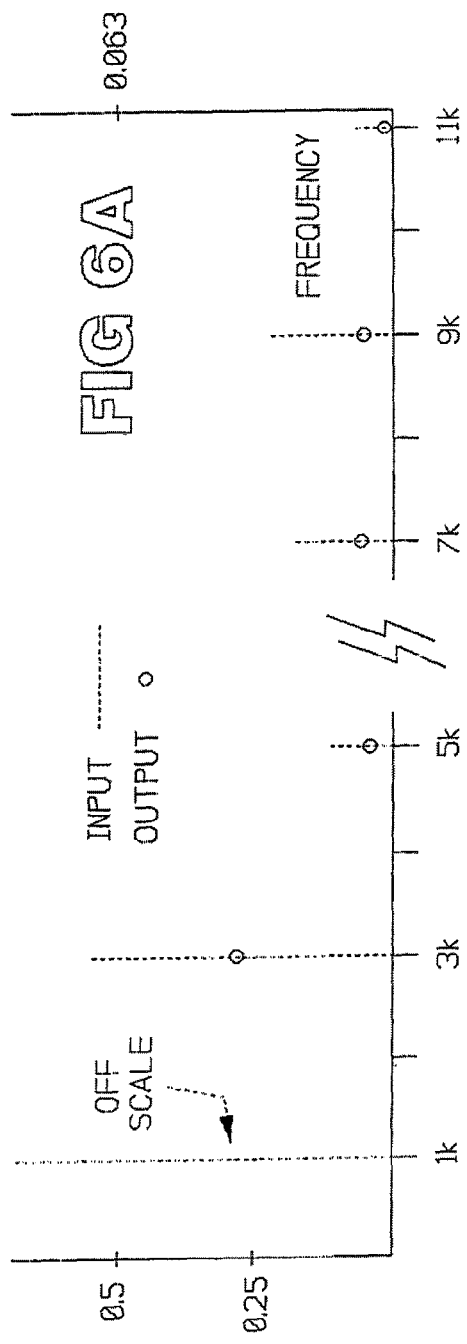

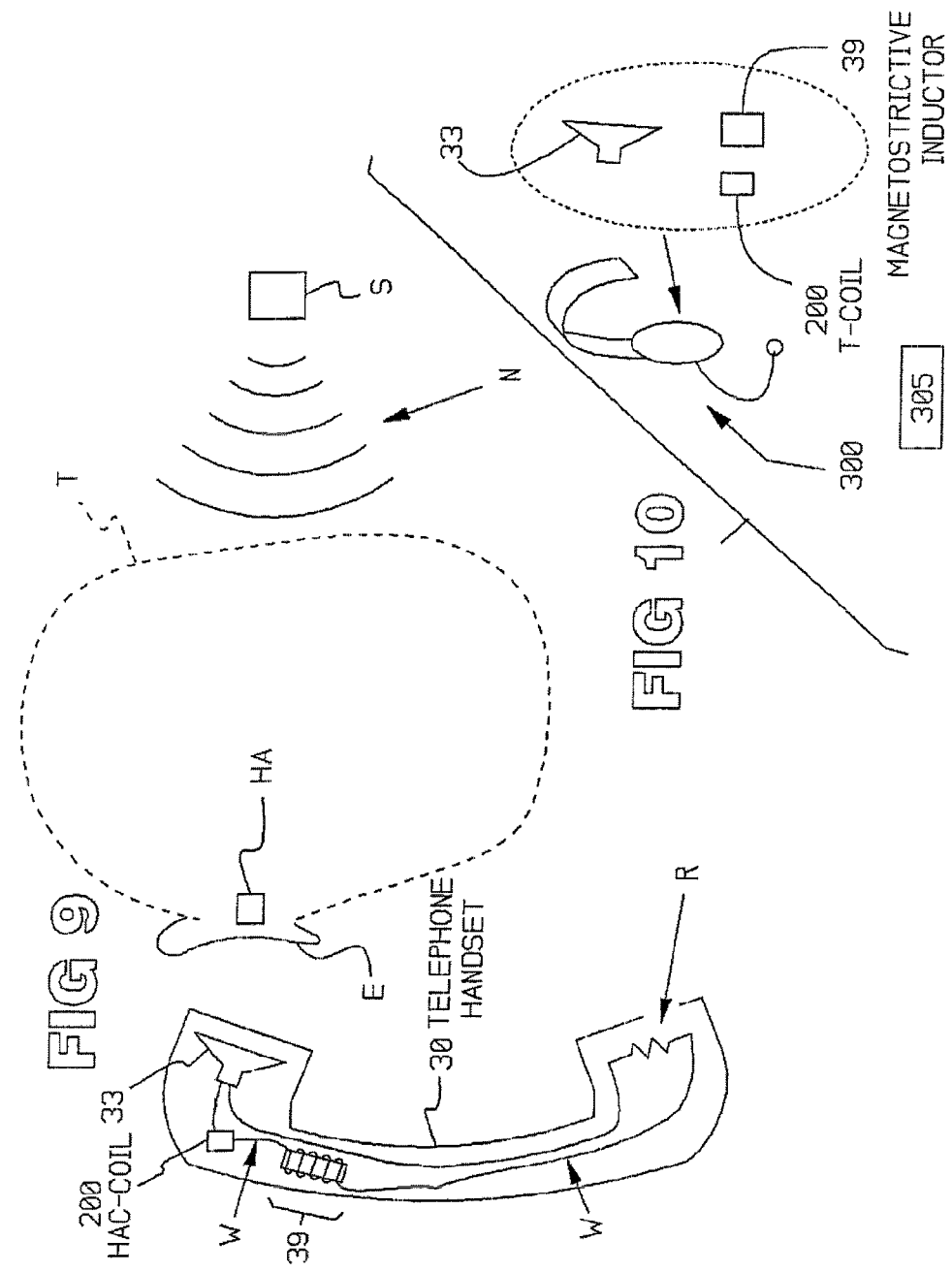

AUDIO SIGNAL SYSTEM

RELATED APPLICATION

This application is a continuation-in-part of previously filed U.S. patent application Ser. No. 10/864,692, "Improved Telephone Handset", filed Jun. 9, 2004; this application is also continuation-in-part of previously filed U.S. patent application Ser. No. 10/864,691 filed Jun. 9, 2004 both of which claim priority to U.S. patent application Ser. No. 60/478,142, filed Jun. 11, 2003; U.S. patent application Ser. No. 60/478,152, filed Jun. 11, 2003; and U.S. patent application Ser. No. 60/478,151, filed Jun. 11, 2003. All of the aforementioned applications are incorporated herein by reference.

TECHNICAL FIELD

This invention relates generally to audio signal devices, more specifically to devices for generating an audio signal. In particular, this invention relates to devices for modifying an audio signal to improve the perceived quality of the signal.

BACKGROUND OF THE INVENTION

Many telephone handsets are equipped with a device termed an HAC coil, or Hearing Aid Compatible coil. The HAC coil acts as an antenna, and broadcasts the audio signal received by the handset to a nearby hearing aid, which contains a similar coil, called a T-coil, which acts as a receiving antenna. This arrangement allows the hearing aid to receive substantially the same audio signal received by the loudspeaker within the handset.

Size restrictions and functional limitations prevent current telephone-hearing aid couplers from providing the quality audio sound required/desired by the hearing impaired. Many devices require the user to switch between operating modes, depending on whether a telephone is being used. Some systems are bulky and cumbersome to use, and most cannot be used with in-the ear and in-the-canal ("ITC") type hearing aids. Additionally, many prior art devices operate in a set, and very limited frequency range, effectively eliminating the ability of a hearing impaired person to hear sounds across a broad range of frequencies.

Typically, most if not all prior art devices focus on transmitting a signal between a handset of a telephone and a hearing device worn by a user. Signal quality enhancement is dependent on both a transmitting transducer and a receiving transducer. Modifying or enhancing a transmitted signal alone, whether to a hearing impaired person or a person of normal hearing, is not considered. Also, a full compliment of signal modification techniques (e.g. filtering, frequency shifting, phase shifting, etc.) are not employed.

Hence, there is a need for a system and method for modifying an audio signal perceived by a listener that overcomes one or more of the drawbacks identified above.

SUMMARY OF THE INVENTION

The audio signal system herein disclosed advances the art and overcomes problems articulated above by providing a system for modifying an audio signal projected toward a receiver, wherein the modification improves the perceived quality of the audio signal.

In particular, and by way of example only, in one embodiment an audio signal system is provided including: an audio signal output device; a magnetostrictive core; and at least one wire wound about the magnetostrictive core, wherein an electrical signal translated through the at least one wire induces a vibration of the magnetostrictive core, and further wherein vibration of the magnetostrictive core generates an output signal which couples with an audio signal produced by the audio signal output device.

In another embodiment, a method for generating a modified audio signal is provided, including: providing a magnetostrictive core wound with at least one wire; translating a first electrical signal through an audio signal output device to generate a baseline audio signal; and translating a second electrical signal through the at least one wire to induce the magnetostrictive core to vibrate, wherein vibration of the magnetostrictive core produces an output signal, and further wherein the output signal may be selectively tuned and coupled with the baseline audio signal to generate the modified audio signal.

In yet another embodiment, a method for modifying an audio signal perceived by a hearing impaired person is provided including: providing a magnetostrictive core wound with at least one wire; translating a first electrical signal through an audio output device to generate the audio signal; translating a second electrical signal through the at least one wire to induce the magnetostrictive core to vibrate, wherein vibration of the magnetostrictive core produces an output signal, and further wherein the output signal couples with the audio signal to modify the audio signal; and transmitting the modified audio signal to a receiver in a hearing aid worn by the hearing impaired person.

In still yet another embodiment, provided is an improved audio signal system of the type in which an electrical signal, derived from a received audio signal, is used by an output device to replicate the received audio signal, wherein the improvement includes a modifying mechanism for modifying the characteristics of the replicated audio signal to improve perceived replicated audio signal quality.

In one embodiment, provided is an audio signal system including: an output means for outputting an audio signal; a means for inducing a magnetostrictive core to vibrate; and a means for coupling a vibratory output of the magnetostrictive core with an audio signal from the outputting means to enhance the perceived quality of the audio signal.

BRIEF DESCRIPTION OF THE DRAWINGS

FIG. 1 is a partially cut-away side view of a telephone handset and hearing aid as used in the prior art;

FIG. 2 is a partially cut-away side view of an audio signal system, according to an embodiment;

FIG. 3 is a top view of magnetostrictive coil which can be used in the system of FIG. 2;

FIG. 4 is an electrical schematic of the wound core in FIG. 2 in series with the speaker of FIG. 2;

FIG. 5 is a time-domain plot of the trapezoidal input, produced by the signal generator in FIG. 4, and the resulting output, measured by spectrum analyzer in FIG. 4;

FIGS. 6 and 6A illustrate the frequency spectrum of the output of FIG. 5;

FIG. 9 is a schematic illustrating radiating noise N;

FIG. 10 is a perspective view of a telephone headset, according to an embodiment;

DETAILED DESCRIPTION OF THE INVENTION

Figure 8:
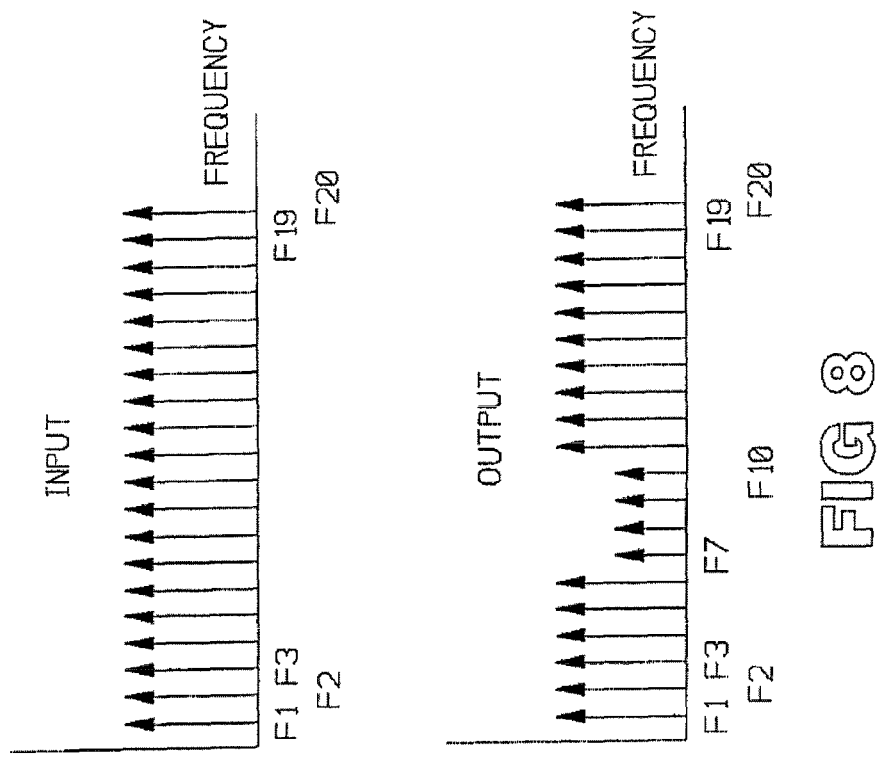
FIG. 8 illustrates frequency response of a notch filter, according to an embodiment.

FIG. 1 illustrates a telephone handset 3, which contains a loudspeaker 6 in the earpiece 9. Many such handsets are equipped with an HAC coil 18, which can be connected with the speaker 6. Such coil-equipped handsets are often termed type-HAC, or Hearing Aid Compatible. The HAC coil 18 produces a magnetic field 21, which couples with a similar coil 24, often termed a T-coil, or telephone coil, within a nearby hearing aid 27, when the latter is held near the handset 3.

The coupling between HAC coil 18 and coil 24 transfers an electromagnetic field derivative of an electronic signal received by the speaker 6 to the hearing aid 27, wherein hearing aid 27 transforms the field back into an electronic signal. The electromagnetic coupling thus allows the hearing aid to receive substantially the same electronic signal received by the speaker 6. The hearing aid 27 then delivers the signal to an earpiece 30, or other device, wherein the signal is converted to an audio signal (e.g. via a speaker) for use by a hearing-impaired person.

The hearing aid 27 may apply signal-processing techniques to the audio signal, to render the signal more intelligible to the hearing-impaired person. Perhaps the most common signal-processing technique is simple amplification of the signal, but other, more sophisticated, techniques are also used. These techniques include, without limitation, 1) filtering, wherein one or more frequency bands are diminished in amplitude, and thereby blocked from reaching the person at their original amplitude;
2) selective amplification, which can be viewed as a type of filtering, wherein selected frequency bands are amplified more than others;
3) phase shifting;
4) time delays; and
5) frequency shifting, wherein one or more frequency bands are shifted in frequency.

In addition, the signal processing techniques include dividing the input signal into two or more frequency bands, and applying one or more of these five techniques to the individual bands. Further, different techniques can be applied to different bands.

One or more of the Inventors herein embarked on a project to improve coupling between the HAC coil 18 and the T-coil 24 within the hearing aid 27, to amplify the signal received by the hearing aid 27. One goal of the amplification was to improve signal-to-noise ratio.

Attempts were made to increase the magnitude of the magnetic field 21 in FIG. 1. It was observed that the particular coil 18 found in one handset was of the air-core type. To increase the magnetic field 21, in one embodiment replacement of the air core with an iron-bearing core was examined.

One motivation lies in the fact that an electric current, such as that carried by the wires of the coil 18, produces a magnetic field vector, termed the H-vector. The arrow 21 in FIG. 1 represents such a vector. The H-vector is more precisely termed the magnetic field strength.

Another vector is associated with the H-vector, namely, the B-vector, termed the magnetic flux density. The B-vector is related to the H-vector by the expression $B=\mu H$, wherein $\mu$ is the permeability of the material in which the H-vector resides.

In an air-cored coil, the H-vector resides in air. The permeability, $\mu$, is relatively low. However, $\mu$ for iron is relatively high, and can be 10,000, 100,000 or even one million times larger than that of air.

Since it was found that the coil 18 contained an air core, replacing the air core by an iron-type core can increase the size of the B-field by a factor of 10,000 to one million. The reason is, again, the fact that the B-vector equals the H-vector multiplied by $\mu$. If $\mu$ is multiplied by, say, 100,000, in changing the core from air to iron, then the B-vector becomes also multiplied by 100,000.

To this end, an inductor containing an iron-bearing core was fabricated and used to replace the coil 18 in a telephone handset. However, during testing, a hearing-impaired person discovered a phenomenon unrelated to the improved coupling between the coil 18 and the hearing aid which was being pursued.

That person discovered that the audio signal emanating from the modified handset, when perceived by the unaided ear, was more intelligible than previously transmitted signals. In this instance, intelligibility conveys the relatively simple concept of accurately and clearly perceiving the sounds, words, etc. of the audio signal.

Further investigation led to the conclusion that a significant feature of the iron-cored coil was not the presence of the iron, which was used to increase permeability. Rather, it was found that the iron core was magnetostrictive, and the improved intelligibility was attributed to the magnetostrictive characteristic. Therefore, in one embodiment, the audio signal system of the present disclosure includes a magnetostrictive core for improving the intelligibility of a perceived audio signal.

A magnetostrictive material is one which changes significantly in dimension in the direction of an applied magnetic field. In at least one embodiment, the magnetostrictive factor of the magnetostrictive material is in the range of 8-12 parts per million (ppm). The magnetostrictive core within an inductor introduces loss into an AC signal applied to the inductor, and thus can be termed "lossy."

Based on this discovery, one or more of the Inventors pursued investigations into different types of magnetostrictive materials. They eventually observed that the magnetostrictive material sold under the trade name METGLAS® provided superior results, as perceived by the hearing impaired person. METGLAS® is a trademark of Metglas, Inc., 440 Allied Drive, Conway, S.C., USA 29526.

In one embodiment, coils constructed using METGLAS® or METGLAS® alloys were fabricated, and tested in a telephone handset, however, it can be appreciated that other sources of audio signals may be used as well. These sources may include a computer, a personal digital assistant, a handheld gaming device, a radio, a stereo, a cassette player, a video recorder/player, a DVD player, a television, a telephone, a cellular phone, or other audio signal sources well known in the art. The testing uncovered three significant features. One feature is that, in one test, a person having a hearing impairment of a profound degree compared speech signals produced by the modified handset with similar speech signals produced by a similar, but unmodified handset, containing an ordinary T-coil. This person found that the modified handset provided improved intelligibility of the speech. Signals that at one time were below the hearing threshold could now be perceived.

The type of testing used is described in the science of audiology as speech discrimination testing. The term "profound," as applied to hearing loss, is a term-of-art, and is defined below.

The second feature was observed in testing a person of normal hearing ability. It was found that the modified handset either (1) did not distort the speech produced by the handset, or (2) any distortion did not affect intelligibility of such speech, as perceived by this person.

The third feature was found in a test performed on brain functioning of a hearing-impaired person having a profound hearing loss. An ordinary handset, used without a hearing aid, produced no measured brain response in such person. This led to the inference that the hearing mechanisms of the ear in this person were deficient in delivering auditory signals to the brain.

In contrast, when using the modified handset containing the METGLAS® cored coil, brain response was detected, leading to the inference that the modified handset overcame at least some of the deficiencies in the hearing mechanisms. Brain response was measured using the well-known auditory brainstem response (ABR) protocol of diagnostic techniques.

FIG. 2 illustrates one embodiment of the present invention. A telephone handset 30 contains a commercially available loudspeaker 33, and an inductor 39 having a highly magnetostrictive core 42 is coupled with, and positioned prior to, loudspeaker 33. Of note, the magnetostrictive core 42 may be positioned in series or in parallel with loudspeaker 33. FIG. 3 illustrates one suitable inductor 39. Of note, the audio signal output device of FIG. 2 is a loudspeaker 33 mounted in a telephone handset 30. In at least one embodiment, the audio signal output device is a speaker electrically coupled with a stereo, DVD player, television or other source of an audio signal. Other audio signal output devices or non-speaker vibratory elements, well known in the art, may be employed as well, and may include devices such as "smart cards" for wireless devices which can act as an output speaker.

In FIG. 3, a toroidal, magnetostrictive core 42 is constructed of the commercially available material, such as METGLAS.® It can be appreciated by those skilled in the art that any magnetostrictive material having a sufficient magnetostrictive factor (e.g. 8-12 ppms) may be used. In particular, the material may be ferromagnetic.

Surrounding the core 42 are multiple windings 44 of common magnet wire, as used in ordinary inductors. The wire may be any gauge of electrical wire, and typically is in the range of 25-45 gauge wire. Similarly, any number of windings may be used. In at least one embodiment, the number of windings 44, or loops, may be in the range of 50-500 windings. In one embodiment, the number of windings 44 lies preferably in the range of 150 to 250.

In one embodiment of the present invention, the inductance, measured at audio frequencies, lies in the range of 0.15 to 0.8 milli-Henries. Further, in one embodiment, resistance lies in the range of 1 to 5 ohms. The inductance and resistance of the inductor 39 may be modified through material selection and the number of windings 44 employed. Performance of the audio signal system of the present invention may, therefore, be tailored for a particular individual or application. Optimization may include varying the core material and inner diameter of the core, as well as varying the gauge of the wire and hence the number of windings.

One type of toroidal magnetostrictive core which has been tested is that designated by the Honeywell/Allied part number 0803 MDGC, which refers to a bare toroidal core constructed of Metglas material, lacking any windings. Another core which has been tested is that sold by Advanced Magnetic Technology ("AMT"), as part number C0715(M). The core may be of varying size (diameter, etc.) and shape, to include a toroid, a rectangular bar, or a cylinder. In at least one embodiment, the magnetostrictive core is continuous.

Figure 14:
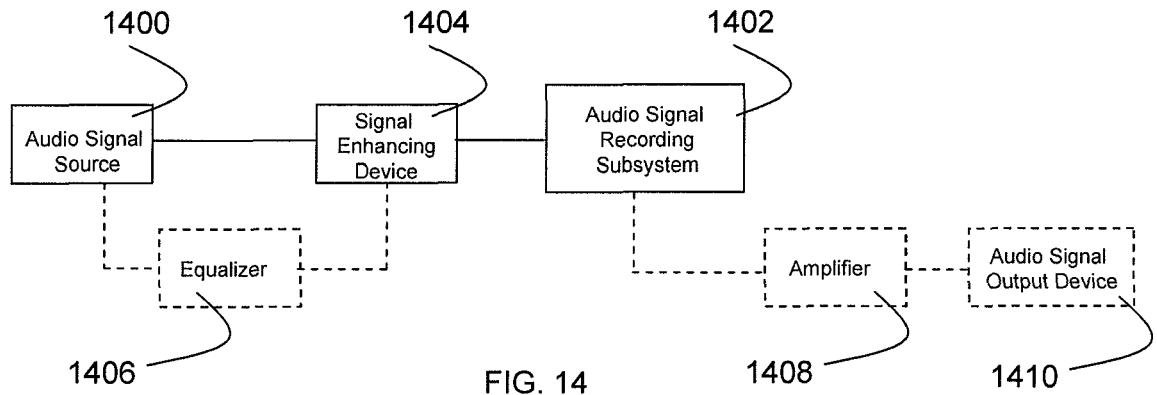
FIG. 14 is an electrical schematic of signal processing using the present invention.
Figure 15:
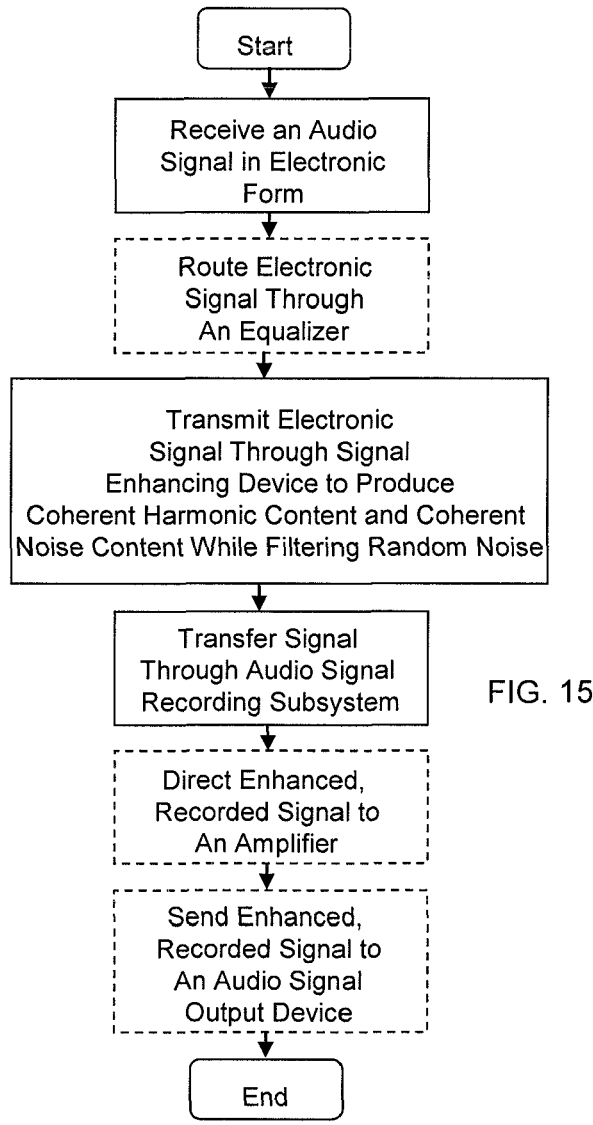
FIG. 15 is a flow chart for a method for enhancing a recorded audio signal.

In the operation of the present invention, as depicted in FIGS. 2 and 3, an electrical current, derived from a received audio signal, is transmitted to speaker 33 Typically, the received audio signal is an analog signal which may be converted to a digital signal upon receipt. In at least one embodiment, digital signal processing is performed on the signal prior to receipt by speaker 33. In at least one embodiment, cross-referencing FIG. 3 with FIGS. 14 and 15, it can be seen that signal processing of an audio signal (either analog or digital) may occur as the signal is transferred from an audio signal source 1400 to an audio signal recording subsystem 1402, via the signal enhancing device 1404 (inductor of the present application). In this manner, the signal is enhanced prior to recording, which in turn enhances the quality of the sound as it is later transmitted to a listener, via a speaker or other device. In one embodiment, signal processing, which may be digital signal processing, occurs as the signal is transferred from a recorded sound output device (e.g a compact disc player, a DVD player, a MP3 player, a computer, a tape player, a stored memory device, and a record player) to a second similar medium via a recording subsystem. As further shown in FIG. 14, the signal may be routed through an equalizer 1406, amplifier 1408, or other sound system electronic device in route to the audio signal output device 1410. In at least one embodiment, the inductor of the present invention may be integral to the equalizer 1406, amplifier 1408, etc., In FIG. 15, a method for enhancing a recorded audio signal is presented, consistent with the hardware disclosures herein. The digital signal is then transformed into an analog signal which may be used to replicate the received audio signal.

Concurrently, in at least one embodiment, an alternating current is passed through the wires 44 of inductor 39. The alternating current, flowing through the windings of inductor 39, is modified and produces an alternating magnetic field which acts upon the magnetostrictive core 42. Vibration of the core 42 produces an output which couples with the replicated audio signal projected by speaker 33. The coupling, as described in greater detail below, modifies the replicated audio signal, enhancing the quality of the audio signal as perceived by a listener. It can be appreciated by those skilled in the art that vibration of core 42 may be induced by any number of field effects, to include effects created by the coil or other magnetic components found in speaker 33. Regardless of the operative mechanism, the vibratory output produced by a vibrating core 42 is key to audio output enhancement.

Figure 16:
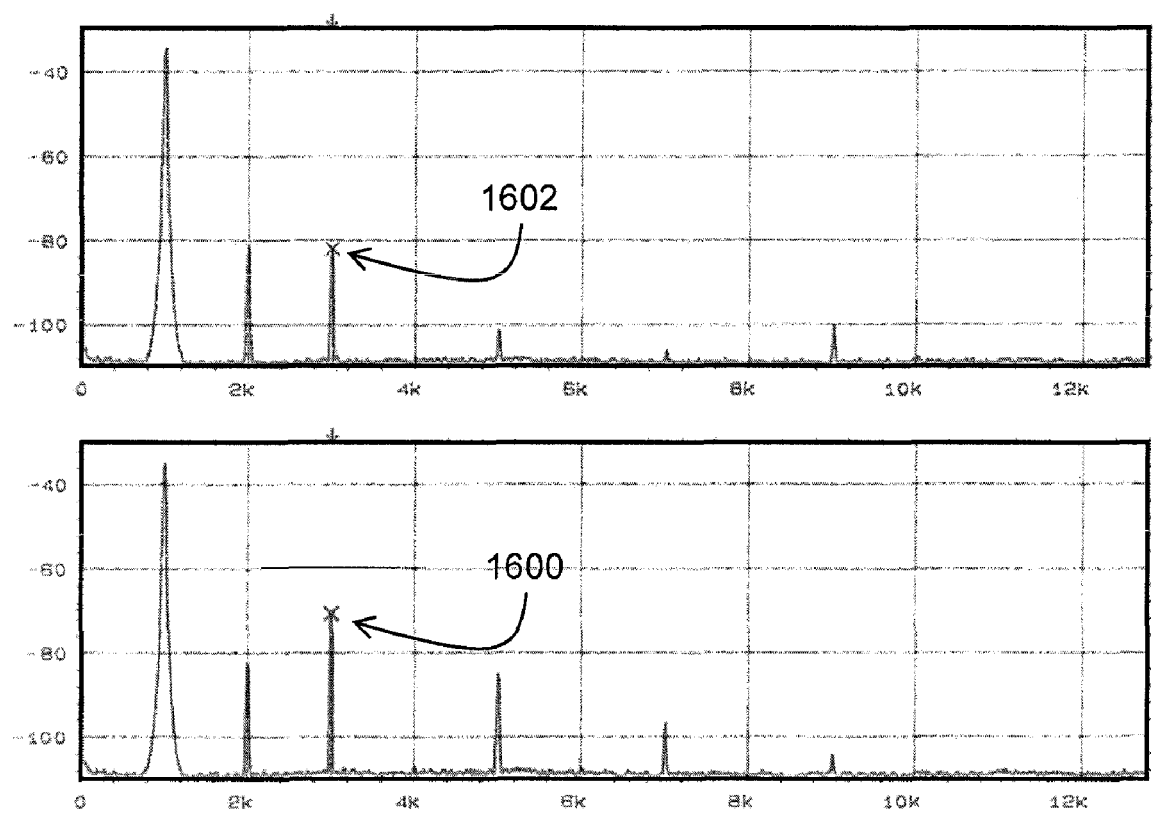
FIG. 16 shows voice-coil harmonics with and without using the present invention.

In at least one embodiment, the electrical current derived from a received audio signal is first transmitted to inductor 39, and then to speaker 33. In this embodiment, transmission of the electrical (analog) signal through the windings of inductor 39 results in a modification of the electrical signal. The modified signal is transmitted to speaker 33, wherein the signal is used to replicate the received/desired audio signal. Modification of the electrical signal may result in the creation of multiple harmonics of the fundamental frequency. Stated differently, coherent harmonic content may be produced to reduce or replace random noise. Referring for a moment to FIG. 16, voice-coil harmonics are shown with 1600 and without 1602 the use of the inductor 39. By way of example, at 3 kHz there is a noticeable improvement, as measured in dB, between the two cases (with and without). Further, signal modification in the inductor 39 may include filtering of higher frequencies and a more subtle roll-off of frequencies at higher levels. Of note, modification of the signal as it passes through inductor 39 adds an element of non-linearity to the signal The non-linearity of the electrical signal helps to enhance output signal quality, and may in part account for the multiple harmonics produced by the electrical signal.

Modification of the electrical signal in the inductor 39, and the vibratory output of inductor 39, both act to enhance the quality of the perceived audio output. Stated differently, two separate yet related phenomenon may act to improve the perceived quality of the output audio signal. First, the electrical signal is modified by virtue of passing the signal through the windings of inductor 39. This modified electrical signal is the signal used by speaker 33 to produce an audio output. Second, vibration of core 42, induced by current flow in the windings or by other field effects present in the vicinity of inductor 39 and speaker 33, produces an output which couples with the output audio signal. In combination, the modified electrical signal and vibratory output act to enhance the output audio signal, as perceived by a receiver (human ear, hearing aid, etc.).

With regard to the modification of the electrical signal, the particular mode of modification may be "harmonic distortion" at higher signal levels, particularly above 3 kHz. The harmonic distortion may be due to a symmetrical "light" saturation of the device of the present invention. Occupation of the signal spectrum above 3 kHz is via energy redistributed from the fundamental harmonic through a distortion process. This harmonic energy is necessarily coherent with the incoming (e.g. speech) signal and as such random noise is effectively replaced with the coherent signal.

A simulation of behavior/performance of the apparatus of FIG. 2 was performed, including at least one embodiment of the audio signal system disclosed herein. FIG. 4 illustrates a model of the inductor-speaker system of FIG. 2. Representative values of inductance and resistance for each component (i.e. inductor 39 and speaker 33) are given. Cross-referencing FIGS. 4 and 5, FIG. 5 illustrates a computed time-domain plot 100 of the response, or output, of one embodiment of the invention, compared to a trapezoidal input 105 of 1,000 Hz frequency, produced by the signal generator 115 in FIG. 4. The response or output 100 was measured at point 117 in FIG. 4 using a spectrum analyzer 112. Likewise, the input signal 105 was measured using spectrum analyzer 113. As shown, the output 100, as generated by inductor 39 in FIG. 4, closely matches the unmodified input signal 105. The output 100 may be transferred to speaker 33 for replication of the input signal 105, and transmission of the replicated signal to a receiver (receiving device, individual, etc.).

Referring now to FIG. 6, a frequency-domain representation, or Fourier spectrum, of both the trapezoidal input 105 (FIG. 5) and the output 100 (FIG. 5), each being so-labeled, and showing only frequencies at 11 KHz and lower, is presented. FIG. 6A illustrates the plot at an expanded scale on the vertical axis, to show frequency components which are too small to depict in FIG. 6. Further, the frequencies at 7.0 KHz and above are depicted at a still greater expanded scale, which is indicated at the right side of the plot in FIG. 6A. FIGS. 6 and 6A clearly show that the magnitude of the odd harmonics in the output 100 are modified, compared with the input 105. Further, in at least one embodiment, an enhancement of the fundamental frequency harmonics occurs, providing an enhanced, higher quality audio signal, as perceived by either a hearing impaired person or one of normal hearing.

Also, since FIGS. 6 and 6A indicate that high frequencies are attenuated, it may be stated that the inductor 39 in FIG. 4 may act as a low-pass filter. For example, in FIG. 6, the magnitude of the harmonic signal a frequency of 3 KHz is significantly reduced compared to the signal at 1 KHz. Above 3 kHz, signal detection is nearly non-existent. The same may be said when comparing the signals of FIG. 6A. Although some output signal 100 may be detected at higher frequencies (e.g. 5-11 KHz), the magnitude of the output signal, in many instances, is inconsequential. In one embodiment, therefore, the audio signal system of the present invention may be a low-pass filter. Further, the low-pass filter may be constructed of the inductor windings 44 wound about a magnetostrictive core 42, yielding the inductor 39. In at least one embodiment, the frequency attenuation or drop-off at higher frequencies is a "soft" drop off. Stated differently, higher frequencies are not abruptly clipped, potentially leading to a distortion in the perceived audio signal.

It is known that both computer monitors and cell phones, as well as other electronic devices/sources of audio signals, generate stray radiation or electromagnetic interference (EMI) in hearing aids. Other sources of stray radiation, such as fluorescent lights, motors in cars, and computer chips in cars, also produce interference in hearing aids. It can be appreciated that EMI may also reduce the sound quality of an audio signal perceived by an individual of normal hearing.

This EMI produces audible noise to the user, which interferes with the user's attempts to hear incoming sounds. Typically, in prior art devices to include hearing aids, filtering of noise occurs in an amplifier device. Any noise introduced post-amplifier is not filtered and therefore reaches the receiver (human ear, etc.). In at least one embodiment, the audio signal system of the present disclosure reduces or eliminates various forms of EMI, to include EMI perceived by a person wearing a hearing aid. Noise reduction/elimination may occur at any point prior to an electrical signal reaching the speaker, which is to say, prior to or after noise reduction in an amplifier. Noise filtering may be coupled with a frequency roll-off at higher frequencies (e.g. 4 or 10 KHz). A further noise phenomenon associated with the present invention is the fact that the device (inductor) disclosed herein actually increases noise during lower frequency excitation (e.g. 20 Hz, 40 Hz) by a phenomenon related to the Barkhausen effect. An important aspect of this noise is that it is caused by, and is therefore temporarily coherent with, the audio signal itself. The noise which is added to the signal by this mechanism is thought to play a role in the improvement of hearing thresholds through an effect known as stochastic resonance. Although not completely intuitive, the addition of noise actually improves the signal-to-noise ratio.

Because electromagnetic radiation of all types has a common property, namely, electromagnetic radiation at multiple frequencies, the present invention may be successful in suppressing all types of if EMI, regardless of source. This includes EMI in which the frequency components are randomly distributed. This also includes EMI in which frequency components are uniformly distributed. This latter type is sometimes called "white" noise, by analogy to white light, which contains all colors, which are actually frequencies.

FIG. 9 illustrates the handset of FIG. 2, adjacent a human ear "E". A standard hearing aid "HA" is present in the ear. A source "S" of EMI is indicated, together with radiated electrical noise "N". In at least one embodiment of the present invention, the inductor 39, positioned as shown in FIG. 9, reduces or eliminates EMI radiating from source S, at least as perceived by a user of HA.

One possible explanation for the noise reduction is the following. In brief, this explanation contemplates two routes of entry for the noise N to the hearing aid HA. One route is through the head, or skull. Some possible mechanisms which may block this route are set forth immediately below. The second route is through the ear canal, and this route is possibly blocked by inductor 39, as explained later.

In FIG. 9, dashed line "T" represents the human tissues surrounding the ear "A", and these tissues represent the human head generally. These tissues are composed largely of water. The water contains numerous electrolytes, and is thus electrically conductive. Being conductive, the water, in theory, will reflect electromagnetic radiation, since conductors, in general, are treated as reflectors of such radiation. Since the noise N takes the form of electromagnetic radiation, the electrolyte-bearing water, in theory, reflects the noise N. The reflected noise N does not reach the hearing aid HA.

However, the electrolyte-bearing water is probably not a perfect reflector. Some noise N is expected to enter the water. The electrolytes in the water may dissipate the entering noise, and two models explaining the possible dissipation are the following.

It is known that electromagnetic radiation, such as the noise N, contains two field vectors: an electric field, and a magnetic field, arranged at 90 degrees to the electric field. These field vectors continually oscillate.

That is, each field vector increases in magnitude to a positive peak value, then decreases to zero. Then the field reverses in direction, and increases to a negative peak value. After reaching the negative peak, it decreases to zero, and then increases to the positive peak value, and the process repeats. Water is a dipole: each water molecule contains a positively charged end, and a negatively charged end. Being dipoles, the water molecules tend to align with the electric field vector. Since that vector is continually changing in direction, the water molecule also continually attempts to change in direction, in attempting to remain aligned with the electric field vector. That continual movement of the water molecules represents thermal energy, and the oscillating electric field vector may cause the movement to increase. The agitation of the water induced by the oscillating electric field causes a slight rise in temperature. The rise in temperature absorbs energy from the electric field vector in the noise N. In theory, the absorption reduces the magnitude of the electric field vector, thus reducing the noise N reaching the hearing aid HA.

A similar analysis can be made with respect to the oscillating magnetic field vector, which may generate eddy currents in the electrolyte-bearing water, also absorbing energy. Thus, it may occur that the energy absorption modes just described serve to block part, or all, of the noise N from reaching the hearing aid HA, through the tissues of the skull.

The second route to the hearing aid is through the ear canal (not shown). However, when the handset is adjacent the ear E, the wires "W", and also the coils of wires (not labeled) in the speaker 33, the HAC-coil 200, and the magnetostrictive inductor 39, may act as receiving antennas, and pick up the noise N. The magnetostrictive inductor 39, as explained above, which is connected to those wires, may dissipate energy in the noise N, because of the resistive properties of the magnetostrictive material.

It is emphasized that the preceding is presented as a possible explanation for an observed phenomenon. The observed phenomenon is that the handset 30, when positioned adjacent the ear of a person wearing a hearing aid, suppresses interference otherwise picked up by the hearing aid HA, when near a computer monitor or a cell phone. The preceding discussion is presented as a plausibility argument.

Two further points regarding FIG. 9 will be addressed. First, it seems unlikely that noise-energy will be dissipated in the magnetostrictive inductor 39, if that inductor 39 faces an open circuit. One reason is that no current flows through the coil in such a situation. Thus, it may be necessary that the inductor 39 face a completed circuit, represented by resistor "R", in order for the noise suppression described above to occur. The second point is that the HAC-coil 200 is not necessarily required. It may be omitted in some applications of the present invention.

In yet another embodiment of the present invention, the noise-suppression features just described improve the sound quality for a person of normal hearing using a device to receive/listen to an audio signal. It has been found that when a handset 30 of FIG. 9 is fashioned into a headset, which includes the magnetostrictive inductor 39, this headset can benefit persons having normal hearing.

Specifically, as shown in FIG. 10, a telephone headset 300 incorporating the magnetostrictive inductor 39 as described above is used with a cell phone 305, in so-called hands-free mode. Persons having normal hearing have reported that this modified headset 300 improves sound quality when receiving/listening to an audio signal. Thus, the headset 300 may provide three modes of operation as described above, namely, (1) T-coil support for a hearing aid, (2) use by a person wearing a hearing aid in microphone mode, and (3) use of the headset 300 alone, by a hearing-impaired person who is not presently using a hearing aid. In addition, the headset 300 provides improved sound quality to a person of normal hearing ability.

In addition to the embodiments described above, it was found that a single, electrically passive device, namely inductor 39 containing a magnetostrictive core 42 (FIG. 3), when added to a telephone handset, improved intelligibility of speech to a hearing-impaired person. In one or more embodiments of the present invention, the magnetostrictive inductor 39 performs one, or more, of the signal-processing functions ordinarily performed by hearing aids. These functions may include:

1) filtering;
2) selective amplification;
3) phase shifting;
4) time delays; and
5) frequency shifting.

Figure 7:
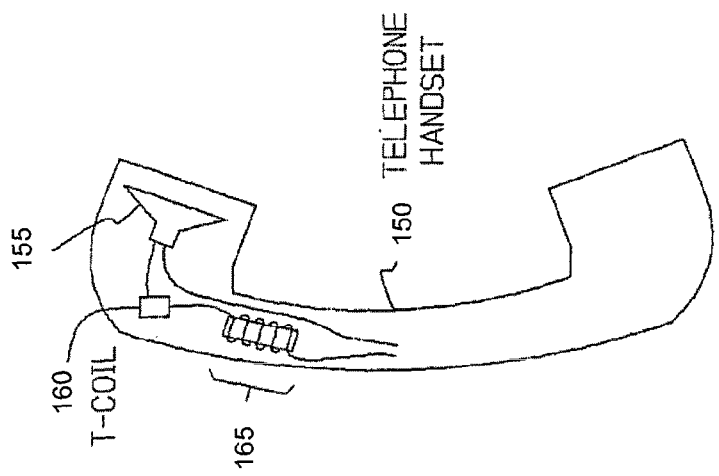
FIG. 7 is a partially cut-away side view of an audio signal system, according to an embodiment.

In one or more embodiments, the inductor 39 containing a magnetostrictive core 42 is used in addition to an HAC-coil present in a handset and used to couple with a T-coil. FIG. 7 illustrates one embodiment, wherein a telephone handset 150 contains a prior-art speaker 155, a prior-art HAC coil 160, and the magnetostrictive inductor 165 as described herein. Such a handset allows a person desiring the assistance of a hearing aid to utilize the coil 160, and other persons to use the handset alone with inductor 165.

One approach to designing a handset 150 which implements the an embodiment of the invention as described above is the following. First, the desired operating characteristics of the telephone handset 150 are obtained. For example, the desired operating characteristics can be determined through testing of a hearing-impaired person, to determine that person's needs. As a specific example, it may be determined that a specific person has diminished hearing in a specific frequency range. The desired output characteristic for that person may call for boosted amplitude in that frequency range, to compensate for the diminution.

The desired output characteristics can be specified by the transfer function of the handset 150, which is sometimes termed the frequency response. The latter term refers generally to a type of output spectrum, such as the output spectrum in FIG. 8, which is produced in response to an input spectrum. In the example of FIG. 8, it is seen that the input spectrum is uniformly distributed across all frequencies from F1 to F20. However, the output spectrum diminishes frequencies in the range of F7 to F10. In this particular example, a notch filter is the desired operating characteristic, with the notch lying between F7 and F10. Of course, this characteristic is exemplary, and the particular output spectrum desired will depend on the application in question.

Once the desired output characteristics are ascertained, different inductors 165 of the type shown in FIG. 3 are tested, each inductor 165 having different (1) numbers of windings, (2) core diameters, and (3) core materials, for example. The test is done, for example, by substituting each inductor 165 for the existing HAC coil 160 in the telephone handset 150. In the testing, each inductor 165 is assigned a figure-of-merit, or metric, indicating how well the inductor-handset combination approaches the desired operating characteristics. Then, the inductor 165 having the best metric is chosen.

Speaking generally, when a given operating characteristic of a handset 150 is specified, the particular magnetostrictive inductor 165 needed is not thereby automatically specified. One reason is that it appears that the magnetostrictive inductor 165 interacts electrically with the speaker 155 of the handset 150, and other components. Thus, the electrical properties of the speaker 155, and other components, influence the operating characteristics. Since different speakers in different handsets have different electrical characteristics, the inductor 165 used may be matched to the particular handset 150 in question. In at least one embodiment, matching inductor 165 to handset 150 may not be required or desired.

Still referring to FIG. 7, in one embodiment the acoustic signal delivered to the user of the handset 150 is not produced exclusively by the speaker 155 of the handset 150, but may be also produced by the magnetostrictive inductor 165. That is, the magnetostrictive inductor 165 may act as an auxiliary speaker. In addition, since the magnetostrictive inductor 165 will, in general, be fastened to the housing of the handset 150, vibration of the coil of inductor 165 may be transferred to the housing. The housing may, in effect, act as a speaker cone, and couple this inductor 165 vibration to the air, or to a human ear in contact with the housing.

Matching inductor 165 to handset 150 assumes that a predefined output characteristic is generated during the design process of the handset 150. In at least one embodiment, standard impedance matching techniques may be used to design an audio signal device of the present invention, and to match the device output with a desired audio output. In yet another embodiment, no pre-defined output characteristic is used. Rather, a "cut-and-try" approach is taken for each different person needing/requiring to use the audio signal system of this disclosure. Different inductors 165 are inserted into a handset 150, and a hearing-impaired person examines each handset 150, by listening to it. The person selects the handset producing the best output.

Considering now the novelty of using a magnetostrictive inductor in greater detail, magnetostriction is a source of loss. For example, it is well known that magnetostriction in electrical transformers (which contain inductors) generate heat, which is a type of loss. Designers of filters used in telephones of the prior art typically seek inductors and capacitors having minimal losses.

Further still, it is quite likely that the magnetostriction of inductors, such as those used in the present invention, introduces resistive properties to the inductor. That is, the magnetostrictive inductor behaves, to a first approximation, like a perfect inductor in series with a perfect resistor. The resistor represents, in part, the loss due to magnetostriction. For analysis and design purposes, a magnetostrictive inductor is represented as an inductor paired with a resistor.

Such a circuit element would not be preferred by a designer of the telephone filters typically present in telephones. One reason is that the overall inductor no longer behaves like a pure inductor, and is therefore more difficult to model. For example, a pure inductor is expressed mathematically in filter design as $jwL$, wherein $j$ is the imaginary operator; $w$ is angular frequency of the signal applied, in radians per second; and $L$ is the inductance, in Henries. Addition of the resistor causes the magnetostrictive inductor to be expressed as $R+jwL$, wherein $R$ is the resistance in ohms. This is now a two-element complex quantity, in the sense of complex-variable algebra, which increases complexity of the algebraic computations.

Still further, as just stated, the algebraic computations have been made more complex, yet no benefit from a filtering perspective is seen from the addition of the R-term. Therefore, it may be argued that despite the fact that filtering inductors have been present in the signal paths of telephones in the prior art, the following conclusions seem clear. One, prior art inductors do not provide assistance to hearing-impaired persons as does the present invention. Two, those inductors, in many cases, are used as parts of audio-frequency filters. Adding magnetostriction would add loss, and also a resistive term. The latter makes computation, and thus design of the prior art filters, more complex. Three, the added complexity caused by the magnetostriction is not offset by any benefit conferred by the addition of magnetostriction to designs of the prior art.

Referring once again to the operation of the present invention, two types of frequency shifting should be distinguished. In one type, as evidenced by one embodiment of the present invention, an input frequency component f1 is shifted to a new frequency in the output, such as f1 1. But input frequency component f1 is not found in the output; it his replaced by f1 1. In yet another embodiment, frequency component f1, or part of it, is also found in the output, in addition to frequency f1 1.

In addition, it should be observed that if one compares the output spectrum with the input spectrum of a frequency-shifted signal, one finds signal components present in the output spectrum which are not present in the input spectrum, namely, the shifted components. It could be said that, therefore, in at least one embodiment new frequency components are added, and appear in the output signal.

The preceding discussion was framed in terms of a telephone handset. The audio signal system of the present invention is also applicable to any system which transmits sound to a listener, including headsets; headphones; earpieces connected to communication devices such as telephones and consumer audio equipment; portable hand-held telephones and cell phones; hands-free telephones and other headsets; and telephones in which substantially all working components are contained within a single housing, which may resemble a handset.

Also, the source of the audio signal reaching the headset is not necessarily considered significant. The signal can be transmitted in a wireless manner. It can originate in digital format, as when originating from a music CD or from a telephone signal taken from the Internet, as in VOIP, Voice Over Internet Protocol. In one embodiment of the invention, the audio signal system is found in a personalized speaker, used by a single individual.

Referring once again to FIG. 3, it is recognized that the coil 39 can be constructed of different materials, of different shapes and sizes, with different numbers of windings. For example, inductance of the coil may be found to be a major contributor to the intelligibility enhancement described herein. It is known that increasing the number of windings will increase inductance, and that decreasing the number of windings will decrease the inductance. It is also known that increasing the permeability of the core material will increase inductance, and that decreasing permeability will decrease the inductance. Therefore, considering only (1) number of windings and (2) permeability of core material, a given level of inductance can be obtained in numerous ways.

By way of example, and not limitation, in one embodiment the core of the magnetostrictive coil 39 in FIG. 3 is constructed of high-saturation material. High saturation is defined as having a saturation level exceeding 5,000 gauss. Many Metglas alloys have a saturation level of 20,000 gauss, or higher.

Considering now, in greater detail, the operation of the present invention with a hearing impaired person, some initial discussion is required. The term "profound hearing loss" was used in the discussion above. This is a term-of-art, and is one of five terms of art used to describe hearing ability in humans. Those five terms, and the associated hearing loss, are the following:

normal—0 to 25 dBHL;
mild—26 to 45 dBHL;
moderate—46 to 70 dBHL;
severe—71 to 90 dBHL; and
profound—91 dBHL and over.

The abbreviation dBHL refers to decibel, and the decibel ranges refer to the quietest sound, measured in decibels, which a person can hear. For example, a person with normal hearing can hear quiet sounds ranging between zero and 25 dBHL. Of course, this is a population average: not every normal person can hear sounds in the lower end of that range. Thus, the person suffering profound loss, discussed above, can hear no sounds quieter than 91 dBHL. As a frame of reference, ordinary conversation is measured at about 50 dBHL.

One or more embodiments of the present invention have been found to provide assistance to persons having moderate, severe, and profound hearing loss, as those terms are defined in the science of audiology, and outlined in the preceding section. The invention should be distinguished from another apparatus which provides assistance to hearing-impaired persons in the use of the telephone or other audio device. That apparatus is the familiar adjustable volume control. However, such controls only provide assistance to persons having mild to moderate hearing loss, as those terms are defined above.

In at least one embodiment, three modes of operation are available for a hearing impaired person. Assume a hearing-impaired person utilizes a standard hearing aid, which has a switch allowing selection of (1) T-coil operation, (2) microphone (i.e., normal) operation, wherein a microphone in the hearing aid picks up incoming sounds and amplifies them, and (3) possibly other settings. Assume also that a telephone handset, or other device, is equipped with (1) the magnetostrictive inductor 39 in FIG. 3, (2) a standard T-coil, and (3) the standard speaker of the earpiece.

In a first mode of operation, the person sets the switch in the hearing aid to the microphone-setting, and utilizes the handset as a person would who lacks hearing impairment. The hearing aid receives sound from the speaker in the handset and amplifies it for the person. In the first mode, the present invention eliminates much annoying acoustic feedback often perceived by a person wearing a hearing aid. Such feedback is often perceived as a whistling sound.

It may be thought that the person can avoid the feedback by using a T-coil with the telephone handset, as described herein, and thereby eliminating acoustic coupling between the speaker in the handset and the microphone in the hearing aid. That coupling is a primary cause of the feedback. However, T-coils are not found in all hearing aids. About two percent of hearing aids are of the "in-the-canal" or "ITC" type, which are very small. In today's technology, T-coils of sufficiently small size to fit into an ITC hearing aid have not been developed, or at least are not widely available at a reasonable price. Thus, persons using ITC hearing aids remain exposed to the feedback. As stated, the present invention reduces or eliminates this feedback in the first mode.

In the second mode of operation, the person sets the switch to the T-coil-setting, and places the handset adjacent the hearing aid. The person hears the telephone through the hearing aid. In the second mode, acoustic feedback is also suppressed.

In the third mode of operation, the person eliminates the hearing aid, and uses the handset exclusively. As explained above, the handset illustrated in FIG. 2, by itself, has been used successfully by persons having hearing loss exceeding that known as moderate.

In addition to the filtering, etc. disclosed above, a type of frequency shifting is present with at least one embodiment of the present invention. For example, an incoming frequency of 2 kilo-hertz may be shifted, completely or partially, to 4 kilo-hertz.

This shift in frequency may partly explain the success of the present invention in providing a telephone or other device which improves hearing for deaf persons. In particular, it is well known that ordinary human hearing occupies a spectrum from about 50 Hz to about 15 KHz or 20 KHz. However, in today's technology, ordinary telephones have a bandwidth of about 2,500 or 4,000 Hz. Thus, a telephone only passes the lower 2,500 or 4,000 Hz of the range of human hearing. Frequencies above this range are blocked. Thus, for example, if a hypothetical person cannot hear frequencies below 5,000 Hz, then, in theory, that person cannot use a telephone.

Figure 13:
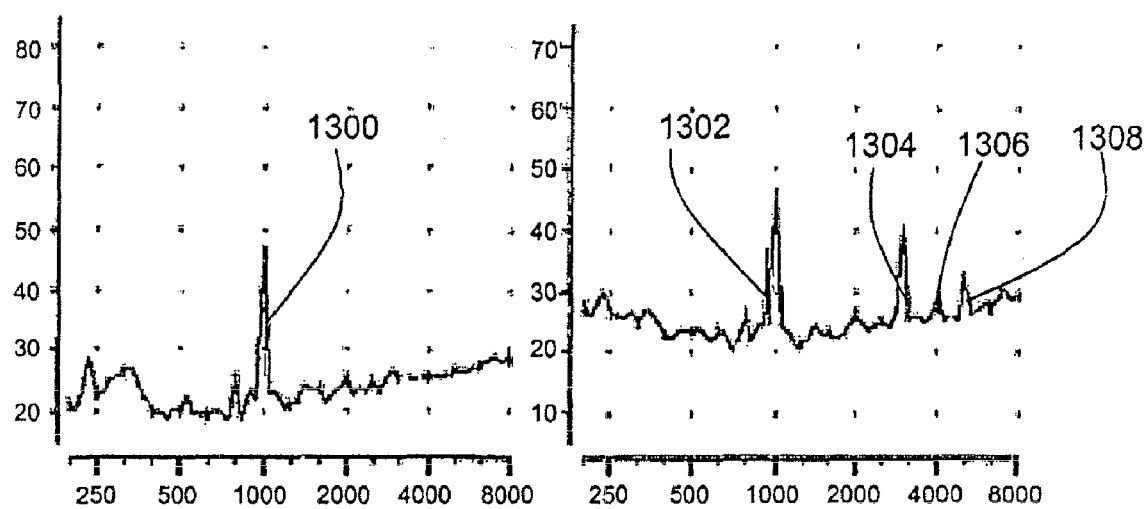
FIG. 13 is a graphical representation of signal enhancement through the addition of multiple harmonics at higher frequencies.

The present invention, in performing the frequency shifting just described, can be viewed as restoring part of the bandwidth suppressed by the telephone system. That is, without the present invention, the user of a telephone will hear a bandwidth having a ceiling at 2,500 or 3,000 Hz. But with one or more embodiments of the present invention, a component at 4 KHz or higher is added, Further, multiple frequency components can be added (e.g. 4 and 6 KHz), and in at least one embodiment, multiple frequency components can be simultaneously added. Referring for a moment to FIG. 13, test date is presented wherein a 1000 Hz signal, at 1.4 volts, was input to both a standard hearing aid coil and an inductor of the present invention. The 1000 Hz signal 1300 input to a standard hearing aid produces no additional signal output at higher frequencies. By contrast, the 1000 Hz signal 1302 input into the present invention, produces recordable signals in and around 3 KHz 1304, 4 KHz 1306 and 6 KHz 1308.

Thus, the present invention may be viewed as expanding the bandwidth of a telephone, or adding frequencies outside the bandwidth of the telephone. Further, expanding the bandwidth may be achieved with other sources of audio signals as well. The present invention may be viewed as (1) synthesizing one or more information-containing frequency components, which may lie inside the bandwidth, outside the bandwidth, or inside and outside the bandwidth of a telephone or other audio signal device, and (2) adding the synthesized components to the acoustic signal delivered to the user of the telephone or other device. This can be viewed as reducing the effects of backward masking.

Figure 11:
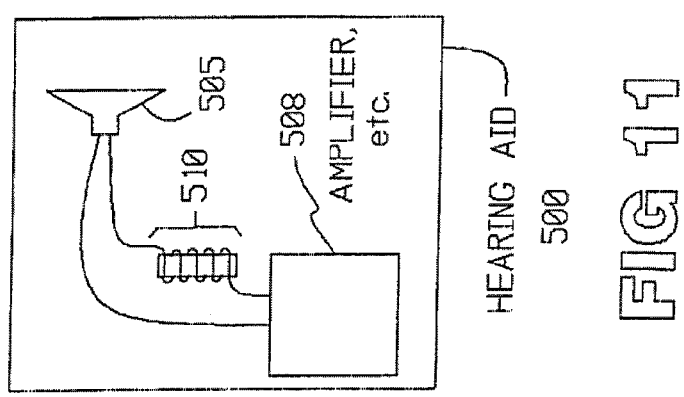
FIG. 11 illustrates schematically a generic hearing instrument, such as a hearing aid.

The invention of the present disclosure is applicable to hearing aids, or assistive devices, whether external or internal, and to hearing instruments generally. FIG. 11 illustrates schematically a generic hearing instrument 500, such as a hearing aid. The hearing instrument 500 contains a speaker 505. Block 508 represents a microphone, and amplification and processing circuitry. Connected with the speaker 505 is an inductor 510, of the type described herein, having a magnetostrictive core.

It was stated above that ITC type hearing aids are generally not equipped with T-coils, because of the small size of ITC hearing aids. However, the magnetostrictive toroidal core which may be used in at least one embodiment of the present invention, may be small enough to fit into any style of hearing aid. Thus, the hearing aid 500 of FIG. 11 can also be taken to represent an in-the-canal or other type of hearing aid, with the inductor 510 being of appropriately small size.

Figure 12:
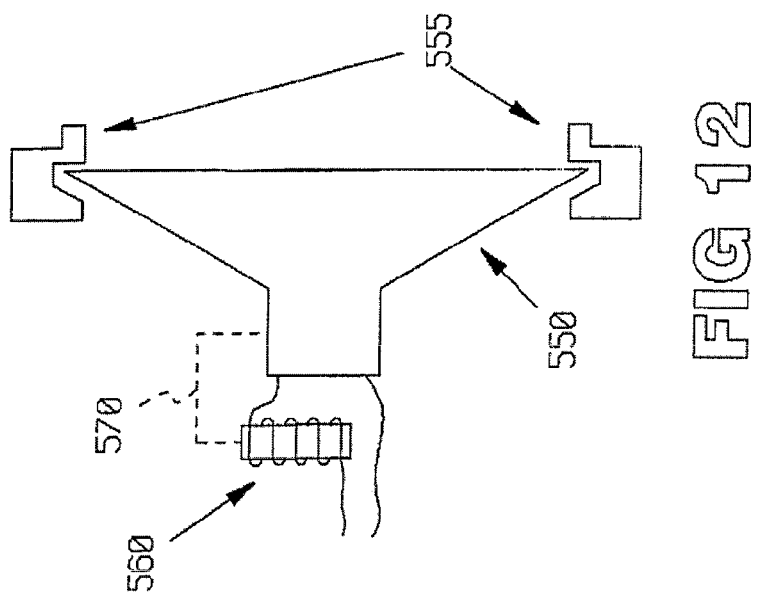
FIG. 12 is an audio signal system, according to an embodiment.

In yet another embodiment of the present invention, as illustrated in FIG. 12, a speaker 550, of the type used in telephone handsets, is shown, and is commonly termed a capsule or speaker capsule. The speaker 550 contains mounting elements 555, indicated schematically, such as appropriate bosses, recesses, bolt holes, mounting points, snap fittings, or any combination of the preceding. The mounting elements 555 are, in general, designed to correspond to the particular telephone handset or other device (not shown) into which the speaker 550 is to be mounted.

The invention attaches a magnetostrictive inductor 560 to the speaker 550. The attachment is indicated by dashed line 570. The integrated speaker-550/inductor-560 is sold as a single product, or capsule, for insertion into telephone handsets by persons, such as hearing-impaired persons, who wish to modify existing handsets, and use the modified handsets. Also, the integrated speaker-550/inductor-560 can also be used by manufacturers of handsets, in their assembly process. In one or more embodiments, attaching inductor 560 to a speaker 550, to any output device, or to any input signal source may include encapsulating or potting the inductor 560 using any one of the materials well known in the art for use in a potting device, e.g. silicon or epoxy. Encapsulation may be full or partial, and it may completely seal inductor 560.

Further, it is possible that a bracket, not shown, can act as an intermediary between the telephone handset and the speaker/inductor combination. That is, the bracket is designed to mount into a handset. It is also designed to receive and support the speaker and inductor.

The discussion above focused on magnetostrictive inductors connected in series with a speaker. However, a series connection is not necessarily required in order for the magnetostrictive inductor to influence the signal reaching the listener. For example, a parallel connection may be suitable. In addition, the magnetostrictive inductor described above can be viewed as a single, discrete element of an electrical filter. A more complex filter can be envisioned, in which one or more magnetostrictive inductors are used, in a network configuration, with other elements possibly added. The other elements can include resistors, capacitors, inductors, and active elements, such as operational amplifiers.

The precise phenomena relating to improved hearing by a hearing impaired person, at least so far as the present invention is concerned, is not completely defined. One contributing factor may also be stochastic resonance, which actually provides for and uses unfiltered ambient noise to enhance the signal-to-noise ratio present with any transmitted signal. Stochastic resonance may be described as a physical phenomena observed in a number of physical systems wherein the addition of noise to a signal may the signal-to-noise ratio. In particular, when the physical system (e.g.:, hearing) receives a signal which is lust below a level required to "excite" the system, the addition of noise, however small the amount, may induce the system to respond to the signal which was previously unable to elicit a response. In at least one embodiment of the present disclosure, the noise is Barkhausen noise. In this manner, the system of the present invention may either filter unwanted noise, making an audio signal more perceptible, or it may incorporate noise, making an audio signal more perceptible. In at least one embodiment, the audio signal system of the present invention may filter unwanted noise and generate thermal and spectrally shaped noise for enhancing the signal-to-noise ratio. Further, as discussed above, small amounts of distortion may be added as well to enhance the signal-to-noise ratio.

The present invention is applicable to the following types of hearing aids, and others: behind-the-ear (BTE), in-the-ear (ITE), in-the-canal (ITC), completely-in-the-canal (CIC), and bone-anchored devices. The present invention is also applicable to the following types of devices, and others: middle ear implanted receivers, brainstem auditory implants, cochlear implants, and assistive devices such as hard-wired, FM, infrared, and loop systems.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A method of processing an audio signal for a person having a hearing impairment, comprising:
   utilizing a passive electrical device comprising an inductor wound about a magnetostrictive core for increasing the intelligibility of the audio signal, the passive electrical device being electrically connected to an audio speaker;
   wherein the magnetostrictive core has a magnetostriction factor exceeding 8 parts per million and causes the audio signal which is otherwise unintelligible to said person to become intelligible to said person.

2. The method of claim 1, wherein the magnetostrictive core is toroidal in shape.

3. The method of claim 1, wherein a telephone handset contains the audio speaker.

4. The method of claim 3, wherein the telephone handset further contains a HAC coil for transmitting signals to a hearing aid.

5. The method of claim 1, further comprising frequency shifting of the audio signal.

6. The method of claim 5, wherein the frequency shifting includes
   a) operating the telephone handset having a bandwidth BW; and
   b) within the telephone handset
      i) synthesizing one or more information-containing frequency components, which lie outside the bandwidth BW, and
      ii) adding the synthesized components to an acoustic signal delivered to said person.

7. A telephone handset comprising:
   an apparatus for processing an audio signal for a person having a hearing impairment, comprising:
   a) an audio speaker, and
   b) a passive electrical device comprising an inductor wound about a magnetostrictive core for increasing the intelligibility of the audio signal, the passive electrical device being electrically connected to the audio speaker, wherein the magnetostrictive core has a magnetostriction factor exceeding 8 parts per million and causes the audio signal which is otherwise unintelligible to said person to become intelligible; and a HAC coil for transmitting signals to a hearing aid.

8. The telephone headset of claim 7, wherein the magnetostrictive core is toroidal in shape.

9. The telephone headset of claim 7, wherein the passive electrical device is configured to shift at least one frequency component of the audio signal, to produce a shifted component, and to deliver the shifted component to the audio speaker.

10. The telephone headset of claim 9, wherein the shifted component is not present in the input audio signal.

11. The telephone headset of claim 7, wherein the audio signal is characterized by a frequency spectrum and the passive electrical device is configured to add frequency components to the frequency spectrum, to thereby increase intelligibility of the audio signal to the person having the hearing impairment.

12. The telephone headset of claim 7, wherein the passive electrical device is configured to:
   i) suppress electromagnetic interference delivered to a hearing aid carried by said person having the hearing impairment; and
   ii) allow said person having the hearing impairment to utilize the handset in two-way communication, without a hearing aid, said person having the hearing impairment having a moderate, severe, or profound hearing loss.

* * * * *